June 21, 1949.　　　　F. C. BRAUN　　　　2,473,855
FLORAL SUPPORT
Filed Jan. 17, 1944　　　　　　　　　　2 Sheets-Sheet 1
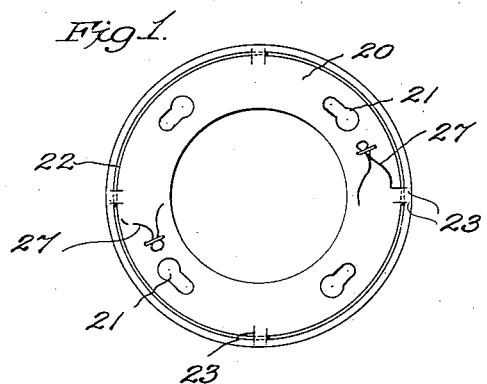
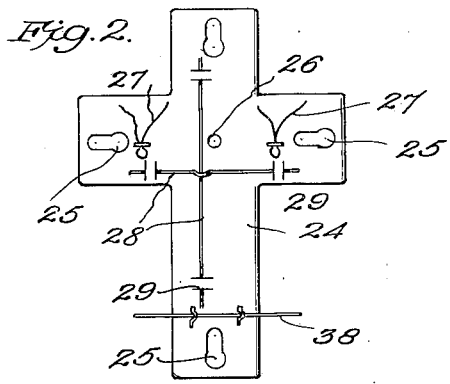
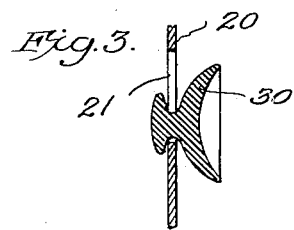
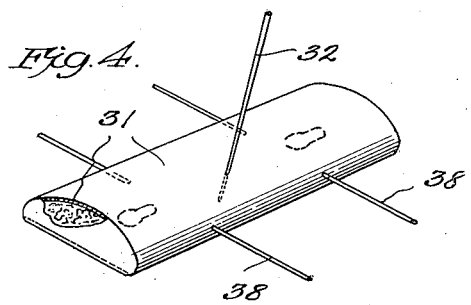
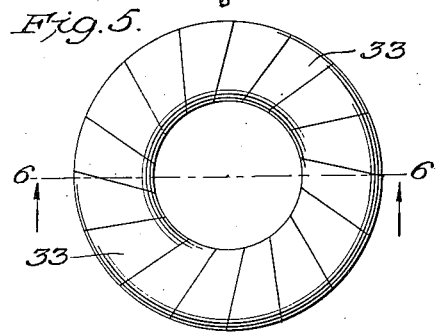
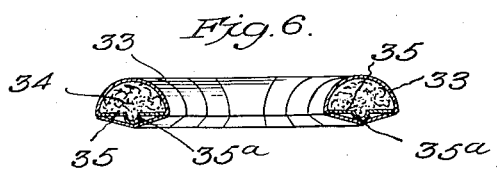
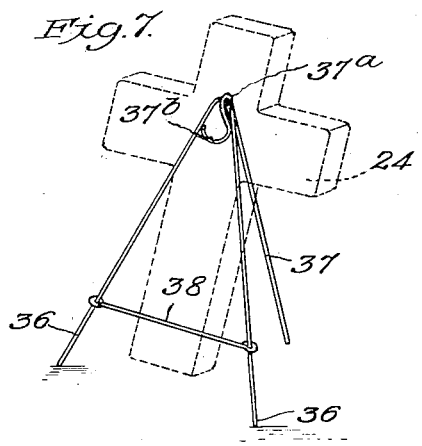
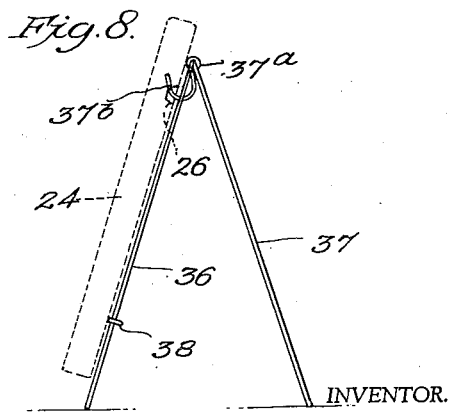
INVENTOR.
FRANK C. BRAUN
BY Ray Belmont Whitman
ATTORNEY June 21, 1949.　　　　F. C. BRAUN　　　　2,473,855
FLORAL SUPPORT
Filed Jan. 17, 1944　　　　　　　　　　　2 Sheets-Sheet 2
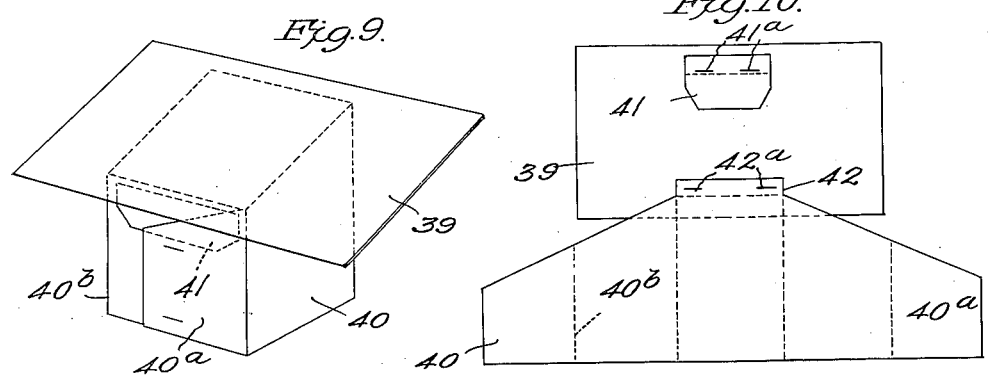
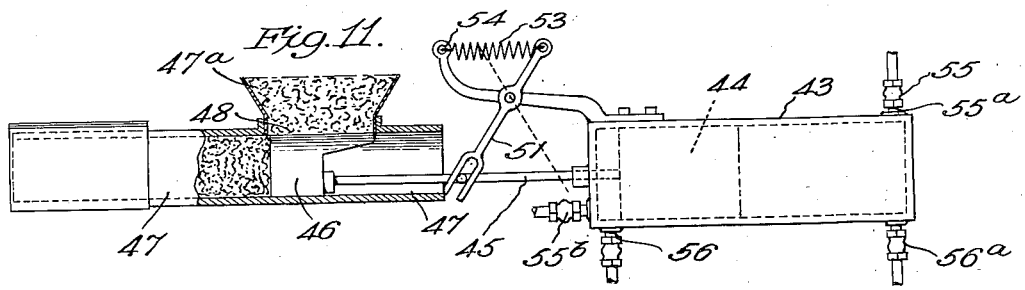
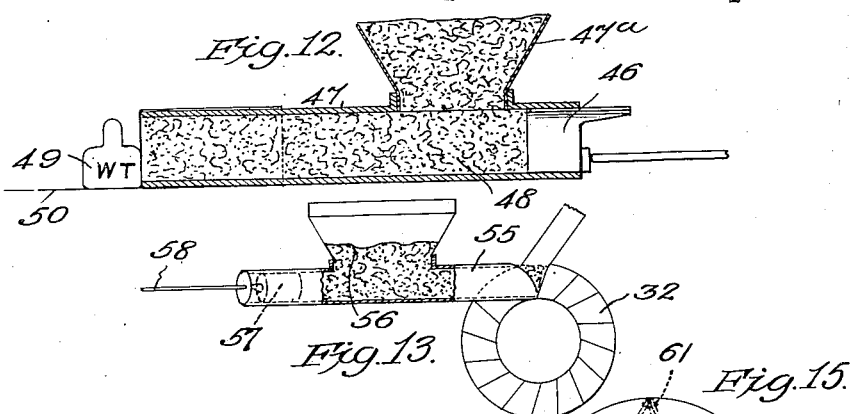
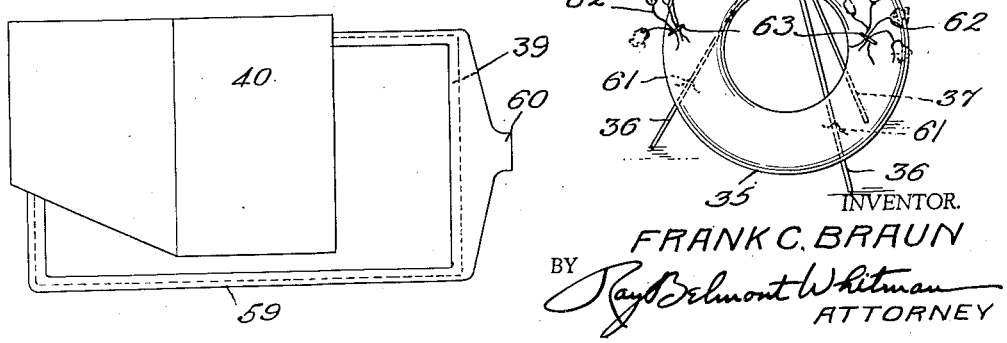
INVENTOR.
FRANK C. BRAUN
BY Ray Belmont Whitman
ATTORNEY Patented June 21, 1949

2,473,855

UNITED STATES PATENT OFFICE 2,473,855

FLORAL SUPPORT

Frank C. Braun, New York, N. Y.

Application January 17, 1944, Serial No. 518,657

4 Claims. (Cl. 41—12)

1

This invention relates to floral supports and the method of making the same, and more especially to inexpensive non-permanent supports utilizing moss or otherwise and held to the easel or other support either by gravity or the use of suction cups.

An object of the invention is to create a floral design utilizing moss or like filling substance applied to the design or support mechanically with the minimum of labor.

Another object is to provide a floral support formed from cardboard or like cheap easily-formed and non-permanent material, provided with "key-hole" openings for removably receiving holding means such as the button-type suction cup.

A further object is to provide a floral support of flexible material, reinforced and stiffened with wire, bamboo, or other rigid members, or by embossing the material itself for the same purpose.

A still further object is to provide a floral wreath formed from a hollow disc, packed moss extruded from a tube and bent to overlie the disc, and a wrapping strip of cellophane or other suitable material, wrapped around both disc and moss to form a unitary buoy-shaped wreath.

Another object is to provide a floral cross with means for both attaching it to a support and suspending it to a wire easel, including means on the latter to support the lower portion of the cross.

Yet another object is to provide a floral pillow support made from folded collapsible cardboard, etc., for ease in shipment and later erection.

All these and other objects, as suggested herebelow, are attained by the method and means now to be described, and illustrated in the accompanying drawing, in which—

Figure 1 is a plan view of a cardboard wreath base equipped with key-hole openings for holding button suction cups, and reinforcing means for rigidity.

Fig. 2 is a similar view of a floral cross base, including also wire members for attaching to a stand or easel.

Fig. 3 is a cross-sectional view of a button suction cup in position on its wreath or other base.

Fig. 4 is a perspective view of a spray bar having a flat cardboard base, moss interior, and rubber-like sack cover, and showing a florist's stick or flower stem inserted into the material by piercing.

Fig. 5 is a plan view of a wreath formed on the base of Fig. 1.

Fig. 6 is a section through the line 6—6 of Fig.

2

5, but showing a modification of the base, utilizing an embossed strengthening rib in lieu of the wire reinforcement.

Fig. 7 is a perspective view of a wire frame easel formed of two wires, and containing a cross support for the lower end of a cross, for instance.

Fig. 8 is a side elevational view of the device of Fig. 7.

Fig. 9 is a perspective view, partly in phantom, of a collapsible cardboard support for floral pillows, fully erected ready for the pillow.

Fig. 10 is a plan view of the device of Fig. 9 in un-erected position.

Fig. 11 is a side elevational view of the essential elements of the mechanism used for packing and applying the moss to a spray bar, for instance, formed by the base and wrapper being positioned outside the moss exit portion thereof.

Fig. 12 is a longitudinal vertical sectional view of a portion of the mechanism of Fig. 11, showing the sliding weight used to vary the degree of compression of the moss automatically by varying the weight.

Fig. 13 is a perspective view, somewhat diagrammatic, of the mechanism used for extruding a rope of packed moss onto a wreath frame, and bending it therearound and wrapping it at the same time.

Fig. 14 is a bottom plan view of a collapsed pillow base, equipped with moss bag and sealable open end, ready for erection and filling with moss.

Fig. 15 is a perspective view of a display form equipped for the rear surface of its base with curved staples for holding three straight wires by sliding friction to form a holding easel therefor.

Like numerals refer to like parts throughout the several views.

There is shown in Fig. 1 a wreath base comprising a circular centrally apertured flat cardboard disc 20 having a plurality of spaced concentric openings 21, of keyhole shape, punched therefrom. These all point in the same direction, as shown. A circular wire 22 for rigidity, is shown positioned through spaced parallel radial slits 23, near one edge of the ring-like base; and one or more easel-holding wires 27 stapled to base 20, for twisting around the easel legs.

Fig. 2 shows a similar base for a cross design, comprising the base member 24, shaped as shown, keyhole openings 25 to receive the holding suction cups, a centrally-disposed hole or opening 26 for suspending the object to an easel, for instance, wires 27 on the rear face for attaching the device to stand or easel and stiffening straight wires 28 held in slits 29 for stiffening the whole surface, as shown.

Fig. 3 shows the button-type suction cup 30 in cross section, as held in place in keyhole opening 21 of member 20, for instance, the button end being inserted into the large end of the hole and then forced into the small holding end thereof.

Fig. 4 shows a spray bar made from a rectangular cardboard base, a cellophane or like wrapper 31 enclosing both the base and the moss insert. This is somewhat semi-circular in cross section, as shown, and adapted to permit the piercing of wrapper and moss by a florist's stick or flower stem 32, for holding the flowers on the surface thereof.

Fig. 5 shows a wreath of the type having a base like that shown in Fig. 1, filled with packed moss in manner as hereinafter explained, and covered with a strip wrapping 33 of cellophane or other suitable material, wound around the same in armature-winding fashion.

Fig. 6 shows this construction in diametral cross section, the moss being shown at 34, and the flat base member 35 showing an outwardly-embossed annular strengthening rib portion 35a.

Fig. 7 is shown a simple form of wire easel, comprising a bent member 36 to form the two front legs, and a pivotal rear leg 37 having a loop 37a at its top to swing over the bend of member 36. The floral design, here shown as cross 24, uses the opening 26, Fig. 2, in its base to suspend it on a downwardly-extending hook portion 37b of leg 37. And a cross wire 38, with bent-over ends, extends laterally across member 24, to pass across the legs 36 to rest in the plane thereof. In the case of a double-ended floral design, like the spray bar, Fig. 4, two such wires 38 are used, one near each end, so the design may be hung from either end.

A collapsible cardboard base for a pillow floral design is shown in Figs. 9 and 10. A hollow base member with a slanted top is formed from cardboard 40, by folding on scores 40b and fastening end flap 40a to the opposite end of 40. This is attached to an overlying top member 39 by a foldable connecting piece 42; being preferably stapled at 42a; and there is also a holding flap 41, shaped and positioned as shown, and connected to the top, as by staples 41a. When set up, the device looks like Fig. 9, being ready to receive on its upper slanted surface the floral pillow foundation, in manner as shown in Fig. 14, and hereafter described.

The method and apparatus for making a spray bar of the type shown in Fig. 4 for instance, will now be described. The apparatus is shown somewhat diagrammatically in Fig. 11, and consists essentially of a compressed air (or steam) cylinder 43, of seamless steel tubing; a piston 44 adapted to slide therein in fluid-tight manner, a piston rod 45 having one end attached to piston 44, and the other end to a moss plunger 46 movable in an aligned chamber 47 with its opposite or exit end open. This chamber and plunger are shaped in cross section like that of the spray bar; that is, in this instance, semi-circular. A central portion 48 of the chamber 47 is cut away from its flat base up, to permit feeding the moss thereto.

By means of a valve (not shown) the expansible fluid, such as compressed air, is admitted to cylinder 43 through inlet pipe 55, to force piston 44 to the left. Through rod 45, this pushes plunger 46 to the left in chamber 47, to compress and move out the moss 48 which has been fed into the chamber opening at that point. The valve at 55 is then closed automatically and another valve exit pipe 56 to exhaust the air, when tension spring 53 contracts to pull the upper end of pivoted lever 51 to the left, which, being pivoted, moves its lower end to the right; and this, being pivotally attached to rod 45, returns both plunger and piston to their initial positions to the right.

This operation is repeated automatically as the operator supplies moss 48 to the opening in chamber 47. Prior to beginning this operation, the operator has positioned a rectangle of cardboard to serve as the base of the spray bar, over the flat surface of chamber 47, and over that has placed a tube-like strip of cellophane with the outer end closed. As the compacted moss is extruded, it emerges from the exit end of the forming chamber on the base cardboard and inside the cellophane wrapper. Now, by referring to Fig. 12, there is shown a weight 49 sliding on a base 50. This is placed in front of the closed wrapper end to form a variable resistance to the extrusion of the formed bar; by changing the weight, different degrees of packing of the moss results.

The manufacture of the wreath is accomplished by a similar method. The wreath is shown at 32, Fig. 13, tangentially positioned at the exit end of the cylindrical chamber 55, through opening 56 of which moss 48 is fed. The packing plunger 57 is operated from rod 58 connected to suitable reciprocal moving means, either power or by hand, as before.

As the rope-like sack of packed moss emerges from the exit end of the tube, which end is beveled as shown, either hand or automatic power means rotates the cardboard base member 20, Fig. 1, and the moss is directed to fall on top of and around this circular shape, while at the same time a band of cellophane 32 is overlappingly wound around both moss and base. When the circle is completed, the wreath is removed, and the final wrapping then finished by hand, or otherwise, and the wrapper end sealed, as by application of heat.

The pillow base, Fig. 10, assembled to form Fig. 9, may be collapsed for shipment to the form of Fig. 14. In this condition, it is used as the base for forming the pillow. A cellophane sack 59, sealed at one end, is placed beneath the base, its upper open edges overlying the base about an inch, to which it is first attached by a suitable adhesive. Then moss may be inserted into the sack from the other end; either by hand or in manner as described for the spray bar above, after which the open end is sealed, as by a gummed flap 60 previously affixed to the wrapper or sack. This article may be conveniently shipped to outlying florists, in collapsed form, to be used by them with their own moss and filled by hand.

The manufacture of other shapes may be accomplished in a generally similar way. For instance, a heart-shaped wreath would have a like-shaped mold containing a piece of cellophane, etc. Moss is then introduced, on top of which a heart-shaped cardboard base is put, then a heart of cellophane is laid, over the edge-sides of which the other cellophane is folded, and a flat heart-shaped weight applied, the edges being, say, a half-inch inside those of the mold. Heating means is then run around outside these edges to seal the two pieces of cellophane together to complete the heart object.

When attaching the easel-holding wires 21, Fig. 2, and 38, Fig. 4, which may be flat or otherwise, and twistable, a wire stapling device is employed with a projecting lip forming the anvil and which can easily pierce the cellophane and moss to reach its clinching position under the base of the article. The user of the floral design then may attach it to the easel, etc., by bending or twisting these wires around the legs thereof.

Thus we have a display form much less expensive to make than those of wire, so common during the past fifty years, and destructible by the elements after its mission is over. Replaceable suction cups readily attach it anywhere needed, whether on the florist's easel or the cemetery monument. It can be reversed in position and held there by the same means, moved sidewise for alignment or better decorative possibilities, shipped moss-less and knock-down, may be self-reinforced to the desired rigidity or reinforcing rods applied through slits cut therein; and the cellophane wrapper is easily pierced by stems and florist's sticks, holds the moss contents tightly due to its slight resiliency; and one adapted to rapid quantity manufacture at lowest possible cost.

In Fig. 15 the cardboard display form 35 is equipped with three curved staples 61, applied by a stapling device, so arranged that two straight front wires 36, 36 and a straight rear wire 37 may be forced through them to form a holding easel for the display form. There is also shown one or more flowers or decoration sprays 62 attached to the front side of base 35 by an ordinary or straight staple 63, thus doing away with the need of a mossed sack and wire sticks on the flower stems which are usually used for decorating the display base to form the object.

Having now described the invention, what is claimed as new and for which Letters Patent of the United States is desired, is:

1. A floral support for inserted stemmed flowers, comprising a flat cardboard base member having an outline shape of predetermined decorative configuration, a reinforcing wire secured upon one surface of said base member in substantially parallel relation to said outline shape, a flower-stem-penetrable moss pad substantially corresponding in outline shape to said base member having a flat rearward surface engaged with the forward surface of said base member and a convex forward surface, and a flower-stem-penetrable flexible covering extending around said base member and said pad to bind them together.

2. The invention as defined in claim 1, further characterized by at least one easel attaching tie wire secured to said base member and extending rearwardly therefrom.

3. The invention as defined in claim 1, further characterized by said base member having at least one key slot adapted to removably receive the attaching button of a suction cup extending rearwardly from said base member.

4. The invention as defined in claim 1, further characterized by said base member being of circular ring shape, and said flexible covering being spirally wound about said base member and said pad.

FRANK C. BRAUN.

REFERENCES CITED

The following references are of record in the file of this patent:

UNITED STATES PATENTS

| Number | Name | Date |
| --- | --- | --- |
| 160,247 | Warren | Feb. 23, 1875 |
| 801,383 | King et al. | Oct. 10, 1905 |
| 948,113 | Moore | Feb. 1, 1910 |
| 1,354,627 | Singman et al. | Oct. 5, 1920 |
| 1,421,595 | Smith | July 4, 1922 |
| 1,594,592 | Birum | Aug. 3, 1926 |
| 1,611,589 | Janusek | Dec. 21, 1926 |
| 1,817,173 | Brandt | Aug. 4, 1931 |
| 1,889,913 | Birum et al. | Dec. 6, 1932 |
| 2,066,844 | Lynch | Jan. 5, 1937 |
| 2,200,948 | Bufton | May 4, 1940 |

FOREIGN PATENTS

| Number | Country | Date |
| --- | --- | --- |
| 352,718 | Great Britain | July 16, 1931 |